United States Patent [19]

Ishiyama

[11] Patent Number: 4,833,581
[45] Date of Patent: May 23, 1989

[54] POWER SUPPLY FOR A MAGNETRON

[75] Inventor: Kunio Ishiyama, Mobara, Japan

[73] Assignees: Hitachi Ltd., Japan; Hitachi Automotive Eng. Co., Ltd., Japan

[21] Appl. No.: 106,668

[22] Filed: Oct. 13, 1987

[30] Foreign Application Priority Data

Oct. 13, 1986 [JP] Japan ............................. 61-241345
Feb. 12, 1987 [JP] Japan ............................. 62-28244

[51] Int. Cl.[4] ........................................ H02M 3/335
[52] U.S. Cl. ........................................ 363/20; 363/61; 219/10.55 B
[58] Field of Search ............................. 363/18–19, 363/20, 21, 59–61, 97; 219/10.55 B; 315/105–107

[56] References Cited

U.S. PATENT DOCUMENTS

| 4,318,165 | 3/1982 | Kornrumpf et al. | 363/21 |
| 4,593,346 | 6/1986 | Nooijen et al. | 363/21 |
| 4,616,300 | 10/1986 | Santelmann, Jr. | 363/21 |
| 4,710,859 | 12/1987 | Rilly | 363/21 |

Primary Examiner—Peter S. Wong
Attorney, Agent, or Firm—Antonelli, Terry & Wands

[57] ABSTRACT

A power supply for a magnetron comprises an inverter circuit for converting a direct voltage obtained from a commercial frequency power source into an alternating voltage of a higher frequency by switching a switching element, a transformer with its primary winding connected to the inverter circuit, a voltage doubler with its input connected to a secondary winding of the transformer and with its output connected between a filament and an anode of a magnetron, and a resonant circuit formed in the voltage doubler for smoothing a current through the magnetron.

3 Claims, 3 Drawing Sheets

4,833,581

POWER SUPPLY FOR A MAGNETRON

BACKGROUND OF THE INVENTION

This invention relates to a power supply circuit for driving a magnetron and more particularly to a power supply circuit which supplies electric power at wide conduction angles for driving a magnetron in a microwave heating apparatus such as a microwave oven at a higher frequency than a commercial frequency.

Conventional power supply circuits for a magnetron in a microwave heating apparatus comprise a transformer for 50 or 60 Hz, condensers and diodes. Recently methods to drive a magnetron at a high frequency in a microwave heating apparatus, for example, a microwave oven have been studied in order to make the apparatus lightweight and compact, and to facilitate the control of its power output by using an inverter power supply. The Japanese Patent Application Laid-open Publication No. 60-250588 discloses a microwave oven which includes means for supplying a constant power to a heater of a magnetron, which is connected to a secondary winding of a transformer in an inverter circuit, and means for controlling the output power by switching a switching element on and off in the inverter circuit and for maintaining the output below a predetermined value for a predetermined time just after power-on.

Employment of a high frequency obtained with an inverter can make electrical parts considerably small and lightweight, resulting in a compact and lightweight microwave heating apparatus, but it leaves much to be desired for its commercialization. One of the problems is that a magnetron conducts little before a voltage Vm across its anode and filament reaches 3.5 KV, for example and conducts abruptly after that as shown in FIG. 1, this resulting in difficulties in the control of power outlet. For these reasons a power supply employing an inverter circuit was not compatible with a magnetron.

SUMMARY OF THE INVENTION

It is an object of the invention to provide a power supply employing an inverter circuit and capable of supplying power to a magnetron efficiently.

According to the present invention, there is provided a power supply for a magnetron wherein a resonant circuit is formed by using a choke coil in a voltage doubler and rectifier circuit employing an inverter circuit so as to supply smoothed power to a magnetron.

A choke coil included in a voltage doubler and rectifier circuit and condesers form a resonant circuit, and waveforms of currents flowing in the voltage doubler and rectifier circuit become less peaked and rounded and can widen a conduction angle of the magnetron, and therefore can reduce peak current flowing through the magnetron for the equal power output.

BRIEF DESCRIPTION OF THE DRAWINGS

FIG. 3 (c) is a graph showing waveshapes of currents and a voltage in a power supply circuit without a resonant circuit;

DETAILED DESCRIPTION OF THE PREFERRED EMBODIMENTS

Figure 2:
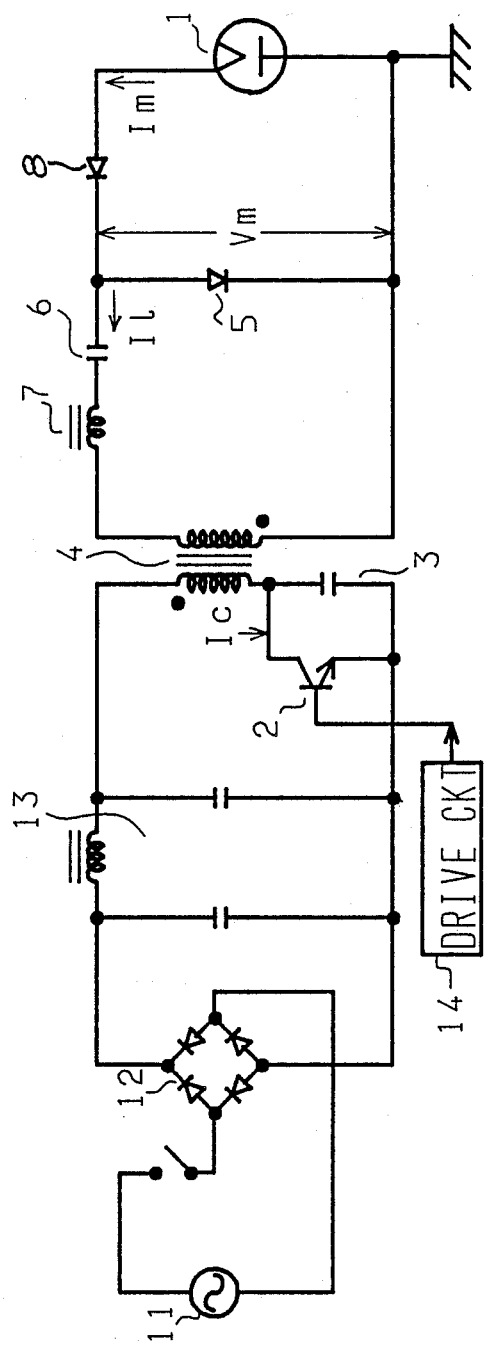
FIG. 2 is a basic circuit of one embodiment of the present invention.

FIG. 2 shows a basic circuit of one embodiment of the present invention. In FIG. 2 the numeral 11 indicates a commercial frequency power source, 12 a rectifier circuit, 13 a smoothing circuit, 4 a transformer, 2 a switching transistor, 3 a condenser connected in series with the primary winding of the transformer 4, 6 a condenser for a voltage doubler, 7 a choke coil, 1 a magnetron, 5 and 8 rectifier diodes and 14 a drive circuit. In this circuit a direct current is generated by the rectifier 12 and the smoothing circuit 13 from the commercial frequency power source 11 and is passed through the primary winding of the transformer 4 in an off-and-on way by switching the transistor 2 with the drive circuit 14. The change of the current in the primary winding induces the high voltage across the secondary winding of the transformer 4. During the first positive half-cycle of the voltage in the secondary winding after the voltage is induced, the condenser 6 charges through the rectifier diode 5 to the voltage Esm and during the next negative half-cycle the voltage Esm and the voltage induced across the secondary winding act in series across the magnetron 1. The condenser 6 is discharged by a like amount at the same time, but its charge is replenished in full during the next positive half-cycle. Therefore, a high voltage is applied across the magnetron 1 with half the period the change of a current in the primary winding of the transformer 4 occurs. This is the same irrespective of the choke coil 7, but the waveshapes of the high voltage differ.

The effect of the choke coil 7 will be explained by using one embodiment referring to FIGS. 2 and 3.

Figure 3:
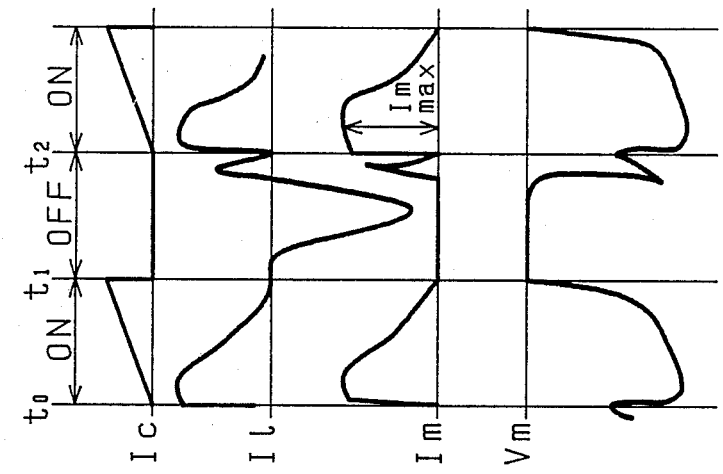
FIGS. 3 (a) and 3 (b) are graphs showing waveshapes of currents and a voltage in power supply circuits of the present invention.
Figure 3:
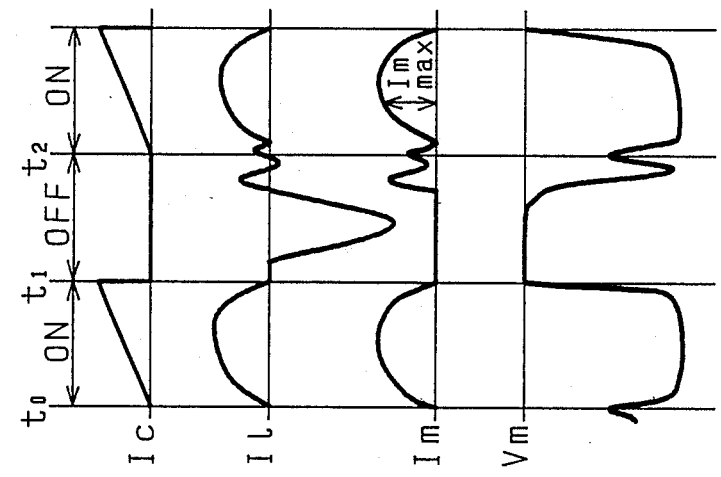
Figure 3:
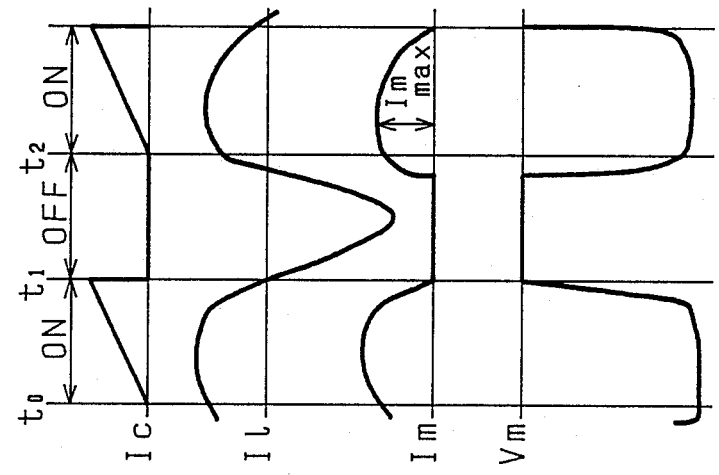

FIG. 3 shows the relationship between the current and the voltage in the circuit shown in FIG. 2 with a choke coil and without one.

Ic indicates a current flowing through the switching element 2, Il is a current flowing through a voltage doubler, Im a current flowing through the magnetron 1, and Vm a voltage across the anode and the filament of the magnetron 1.

FIG. 3 (c) indicates waveshapes of the currents and a voltage in the voltage doubler without the choke coil 7 in FIG. 2. When the switching element 2 is open, the diode 5 is conducting and the condenser 6 is charged. Then, when the switching element 2 is closed, the sum of the voltage across the charged condenser 6 and the voltage induced across the secondary winding of the transformer 4 is applied across the magnetron 1, a current Im flows through the magnetron 1 and the charge in the condenser 6 is discharged and the current Im decreases rapidly.

Figure 1:
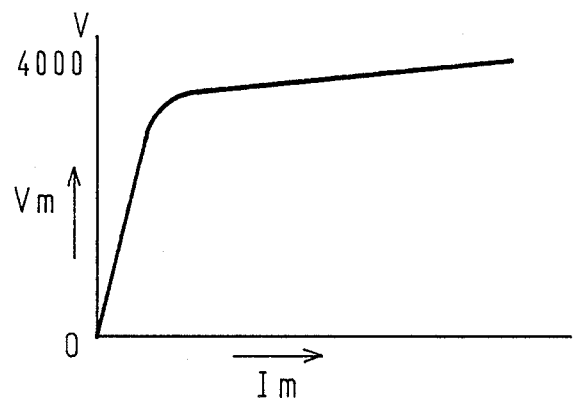
FIG. 1 is a graph showing the voltage-current characteristic of a magnetron.
Figure 4:
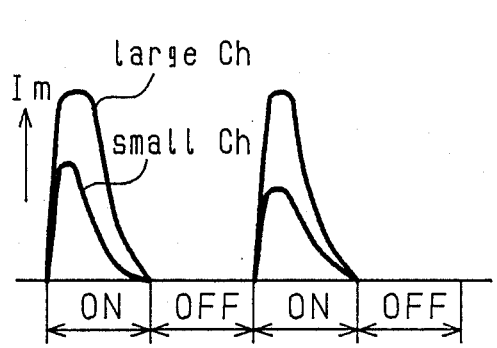
FIGS. 4 (a) and 4 (b) show a relationship between the current and the capacitance in a voltage doubler without a choke coil and with a choke coil, respectively.
Figure 4:
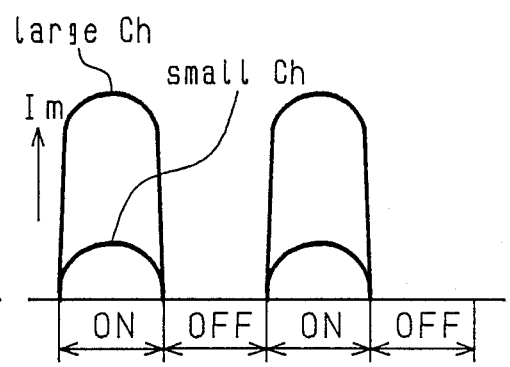

FIG. 4 (a) shows a relationship between the current Im and the capacitance Ch of the condenser 6, and this shows increase in capacitance of the condenser 6 does not widen a conduction angle of the magnetron 1. The problem with this case is that uniform currents do not flow over the time the switching element 2 is closed and therefore the maximum of the current flowing through the magnetron 1, Immax has to be increased excessively so as to obtain a desired power output from the magnetron 1. Immax has to be from 1.5 to 2 times the current required for a magnetron operated with a commercial frequency power supply, and this causes the current density of magnetrons to exceed its maximum allowable value. When the switching element 2 is open and the condenser 6 is charged through the diode 5, oscillations in the circuit produce spikes in the current and consequently generate noises.

FIGS. 3 (a) and (b) show waveshapes of the currents and voltages in the voltage doubler with a choke coil employed as shown in FIG. 2 in accordance with the present invention.

FIG. 3 (b) shows the case in which the choke coil 7 having an inductance Lh is connected in series with the condenser 6 having an capacitance Ch so as to form a resonant circuit with its resonant frequency being the frequency of a voltage induced in the secondary winding of the transformer 4. Resonant currents flows during the time the magnetron 1 conducts and the waveshape of the current Im is less peaked and rounded, resulting in a wider conduction angle and therefore the peak current Immax can be made lower for the same power output of the magnetron 1 than in the case without the choke coil 7 shown in FIG. 3 (c), and prevents occurrence of moding phenomenon, and reduction of peak currents flowing through electrical components in the circuit facilitate design of the components and improves their reliability.

FIG. 3 (b) shows resonant currents cannot be smoothed during the time the switching element 2 is open and spikes in the current remain. FIG. 4 (b) shows a relationship between the current Im and the capacitance Ch.

FIG. 3 (a) shows the case in which the choke coil 7 having an inductance Lh is connected in series with the condenser 6 having an capacitance Ch, Lh and Ch satisfying $$f = \frac{1}{4\pi \sqrt{L'h \frac{Cs \cdot C'h}{Cs + C'h}}} \times \frac{1}{K}$$

where f (Hz) is the frequency of a current flowing through the primary winding of the transformer 4.

n is the ratio of secondary to primary winding turns of the transformer 4.

Cs is the capacitance of the condenser 3,

Lh (H) is the inductance of the choke coil 7,

Ch (F) is the capacitance of the condenser 6,

L'h (H) is $Lh/n^2$,

C'H (F) is $CH \cdot n^2$,

K is 1.0 to 1.2.

The current flowing through the diode 5 does not oscillate with a resonant frequency of the circuit when the switching element 2 is open, but the current oscillates with approximately multiples of the resonant frequency of the circuit by pulling the frequency of oscillation toward multiples of the resonant frequency of the circuit and spikes in the current tend to diminish.

A power supply for a magnetron in accordance with the present invention smoothes the current through a magnetron, reduces noises and stabilizes the operation of the magnetron, resulting in increase in design flexibility of compact and lightweight microwave heating apparatus such as microwave ovens.

What is claimed is:

1. A power supply for a magnetron having a filament and an anode comprising:

an inverter circuit including a transformer having a primary winding and a secondary winding, means for supplying to said secondary winding pulses of current recurring at a frequency and switching means for successively switching direct input energy therefore;

a voltage doubler circuit including a condenser, a diode, an input and an output, said input being connected to said transformer secondary winding and said output being connected between said magnetron filament and anode; and a series resonant circuit formed in series with secondary winding and including said condenser, said resonant circuit being tuned at a frequency not lower than a frequency of said pulses of current and such that a wave shape of current through said secondary winding may be smoothly continuous.

2. A power supply for a magnetron having a filament and an anode comprising:

an inverter circuit including a transformer having a primary winding and a secondary winding, means for supplying to said secondary winding pulses of current recurring at a frequency and switching means for successively switching direct input energy therefore;

a voltage doubler circuit including a condenser, a diode, an input and an output, said input being connected to said transformer secondary winding and said output being connected between said magnetron filament and anode; and a series resonant circuit formed in series with secondary winding and including said condenser and a choke coil, said resonant circuit being tuned at a frequency not lower than a frequency of said pulses of current and such that a wave shape of current through said secondary winding may be smoothly continuous.

3. A power supply for a magnetron according to claim 2 wherein said resonant circuit is formed of said choke coil and said condenser satifying the following equation, $$f = \frac{1}{4\pi \sqrt{L'h \frac{Cs \cdot C'h}{Cs + C'h}}} \times \frac{1}{K}$$

where f (Hz) is the frequency of said pulses of current through said primary winding, n is the ratio of secondary to primary winding turns of said transformer, Cs (F) is the capacitance of a condenser connected in series with said primary winding, Lh (H) is the inductance of said choke coil, Ch (F) is the capacitanceof said condenser, L'h (H) is $Lh/n^2$, C'h (F)=$Ch \cdot n^2$, K is 1.0 to 1.2.

* * * * *